United States Patent
Sato et al.

(10) Patent No.: US 11,712,623 B2
(45) Date of Patent: Aug. 1, 2023

(54) INFORMATION PROCESSING PROGRAM, TERMINAL DEVICE, AND INFORMATION PROCESSING METHOD

(71) Applicant: CYGAMES, INC., Tokyo (JP)

(72) Inventors: Michihiro Sato, Tokyo (JP); Takamichi Yashiki, Tokyo (JP); Soichiro Tamura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/280,565

(22) PCT Filed: Sep. 25, 2019

(86) PCT No.: PCT/JP2019/037431
§ 371 (c)(1),
(2) Date: Mar. 26, 2021

(87) PCT Pub. No.: WO2020/067077
PCT Pub. Date: Apr. 2, 2020

(65) Prior Publication Data
US 2022/0032185 A1    Feb. 3, 2022

(30) Foreign Application Priority Data

Sep. 26, 2018  (JP) ................................. 2018-179896

(51) Int. Cl.
*A63F 13/52*    (2014.01)
*A63F 13/525*   (2014.01)
*A63F 13/45*    (2014.01)

(52) U.S. Cl.
CPC .............. *A63F 13/52* (2014.09); *A63F 13/45* (2014.09)

(58) Field of Classification Search
CPC .... A63F 13/52; A63F 13/525; A63F 2300/53; A63F 2300/534; A63F 2300/538;
(Continued)

(56) References Cited

U.S. PATENT DOCUMENTS 4,305,131 A * 12/1981 Best ..................... A63F 13/47
704/E21.02
5,701,444 A * 12/1997 Baldwin .................. G06T 1/20
345/506
(Continued)

FOREIGN PATENT DOCUMENTS

JP    2014200264 A    10/2014

OTHER PUBLICATIONS

"How to skip cutscenes in FFXIV," by Zachary Marus, Published Feb. 22, 2015. Source:https://www.youtube.com/watch?v=ZjestLllsSo (Year: 2015).*

(Continued)

*Primary Examiner* — Steven J Hylinski
(74) *Attorney, Agent, or Firm* — Osha Bergman Watanabe & Burton LLP

(57) ABSTRACT

Provided is an information processing program that is executed at a terminal device that executes effect rendering for outputting video and audio, the information processing program causing the execution of: a second obtaining unit (74) that obtains skip point information indicating skip points for the effect rendering and skip arrival point information indicating a skip arrival point for the effect rendering; and an effect-rendering control unit (77) that controls the effect rendering by skipping the video data to a predetermined point on the basis of an accepted skip operation to resume the output of the video from that point, and in the case where the timing of accepting the skip operation does not coincide with the skip point, by waiting until the skip point after that timing and then skipping to a specific skip arrival point associated with that skip point, on the basis of the skip operation, to resume the output of the audio from that specific skip arrival point. This makes it possible to seamlessly resume effect rendering for outputting video and
(Continued)

audio after the effect rendering is skipped at an arbitrary timing.

7 Claims, 7 Drawing Sheets

(58) Field of Classification Search
CPC ...... A63F 2300/6009; A63F 2300/6615; A63F 2300/66–6653
See application file for complete search history.

(56) References Cited

U.S. PATENT DOCUMENTS

| | | | | |
|---|---|---|---|---|
| 5,727,192 | A * | 3/1998 | Baldwin | G06F 3/14 345/506 |
| 6,333,745 | B1 * | 12/2001 | Shimomura | G09G 5/363 345/535 |
| 8,606,955 | B1 * | 12/2013 | Fernandes | G06Q 30/0241 709/231 |
| 9,021,390 | B1 * | 4/2015 | Pidhajecky | A63F 13/49 715/808 |
| 10,042,695 | B1 * | 8/2018 | Karppanen | G06F 11/0793 |
| 2001/0049301 | A1 * | 12/2001 | Masuda | A63F 13/45 463/33 |
| 2003/0137537 | A1 * | 7/2003 | Guo | G10L 15/1822 715/751 |
| 2005/0146534 | A1 * | 7/2005 | Fong | G11B 19/16 345/619 |
| 2005/0283791 | A1 * | 12/2005 | McCarthy | H04N 21/6125 725/1 |
| 2006/0098943 | A1 * | 5/2006 | Scott, III | H04N 21/4753 386/261 |
| 2006/0132491 | A1 * | 6/2006 | Riach | G09G 5/395 345/505 |
| 2006/0174021 | A1 * | 8/2006 | Osborne | H04L 69/14 709/230 |
| 2007/0043667 | A1 * | 2/2007 | Qawami | G11B 20/00086 705/50 |
| 2007/0168287 | A1 * | 7/2007 | McCarthy | G06Q 30/06 705/51 |
| 2009/0158198 | A1 * | 6/2009 | Hayter | G06F 9/451 715/781 |
| 2009/0198573 | A1 * | 8/2009 | Fox | G06Q 30/02 705/14.5 |
| 2009/0225076 | A1 * | 9/2009 | Vlietinck | G06T 15/08 345/419 |
| 2009/0248702 | A1 * | 10/2009 | Schwartz | H04N 21/43615 |
| 2010/0083307 | A1 * | 4/2010 | Zalewski | G09B 5/06 725/34 |
| 2010/0088716 | A1 * | 4/2010 | Ellanti | H04N 21/812 725/32 |
| 2014/0169751 | A1 * | 6/2014 | Weast | H04N 21/4436 386/200 |
| 2018/0146054 | A1 * | 5/2018 | Hollinger | H04L 67/306 |
| 2019/0168117 | A1 * | 6/2019 | Miyazaki | A63F 13/22 |
| 2019/0180319 | A1 * | 6/2019 | Jaatinen | G06Q 30/0275 |
| 2019/0247750 | A1 * | 8/2019 | Kuroda | A63F 13/31 |
| 2019/0364308 | A1 * | 11/2019 | Milford | H04N 21/236 |

OTHER PUBLICATIONS

"How can I skip cutscenes I've already seen?" Accessed Jul. 13, 2022. Source: https://na.finalfantasyxiv.com/uiguide/faq/faq-other/setting_cs_skip.html (Year: 2022).*

"5 Things To Do If You Use Cutscenes in Your Video Game," by Shamus Young, published Apr. 14, 2015. Source:https://www.escapistmagazine.com/5-things-to-do-if-you-use-cutscenes-in-your-video-game/ (Year: 2015).*

"Better Game Design Through Cutscenes," by Hugh Hancock, Published Apr. 2, 2002. Source: https://webcache.googleusercontent.com/search?q=cache:NC6SrZ1pkxsJ:https://www.gamedeveloper.com/design/better-game-design-through-cutscenes+&cd=14&hl=en&ct=clnk&gl=us (Year: 2002).*

"How to Build a Better Cutscene," by Adam Schnitzer, Published Mar. 6, 2003. Source: https://webcache.googleusercontent.com/search?q=cache:b15kp0nSoaYJ:https://www.gamedeveloper.com/art/how-to-build-a-better-cutscene+&cd=15&hl=en&ct=clnk&gl=us (Year: 2003).*

"Skip Intros & Pre-rendered Cutscenes," by dinosauriac, published Feb. 14, 2018, Updated Apr. 9, 2021. Source: https://steamcommunity.com/sharedfiles/filedtails/?id=1300847530 (Year: 2021).*

"The Problem with Cutscenes—Mike Matei Blog," by Mike Matei, Published Jan. 24, 2018. Source: https://www.mikematei.com/blog/cutscenes-problem/ (Year: 2018).*

International Search Report issued in International Application No. PCT/JP2019/037431, dated Oct. 29, 2019 (5 pages).

Written Opinion issued in International Application No. PCT/JP2019/037431; dated Oct. 29, 2019 (6 pages).

* cited by examiner

Fig. 4
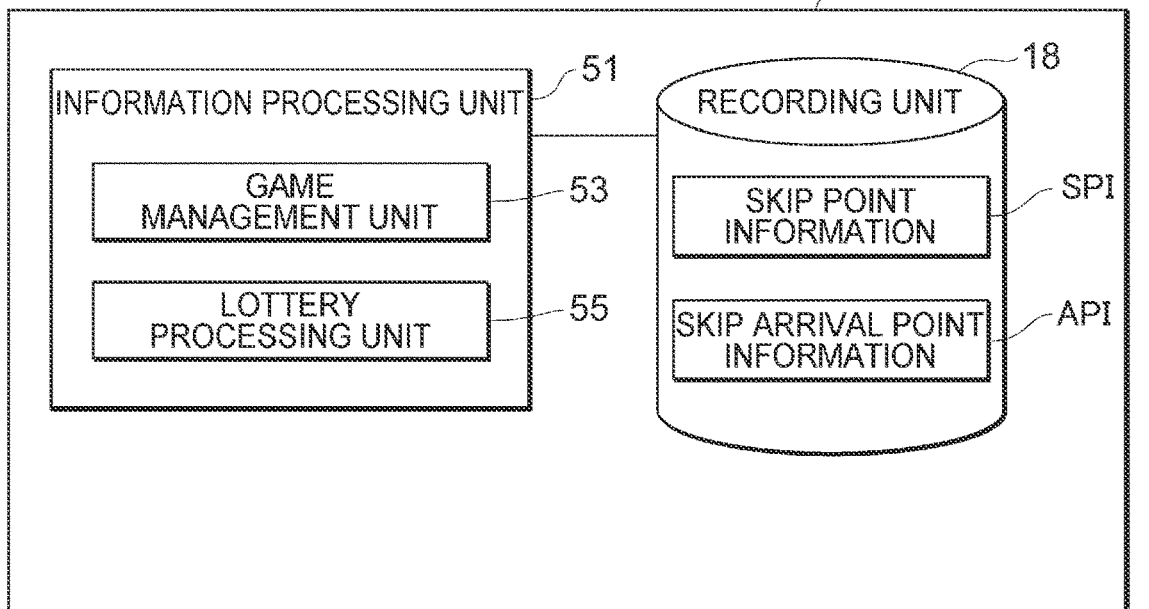
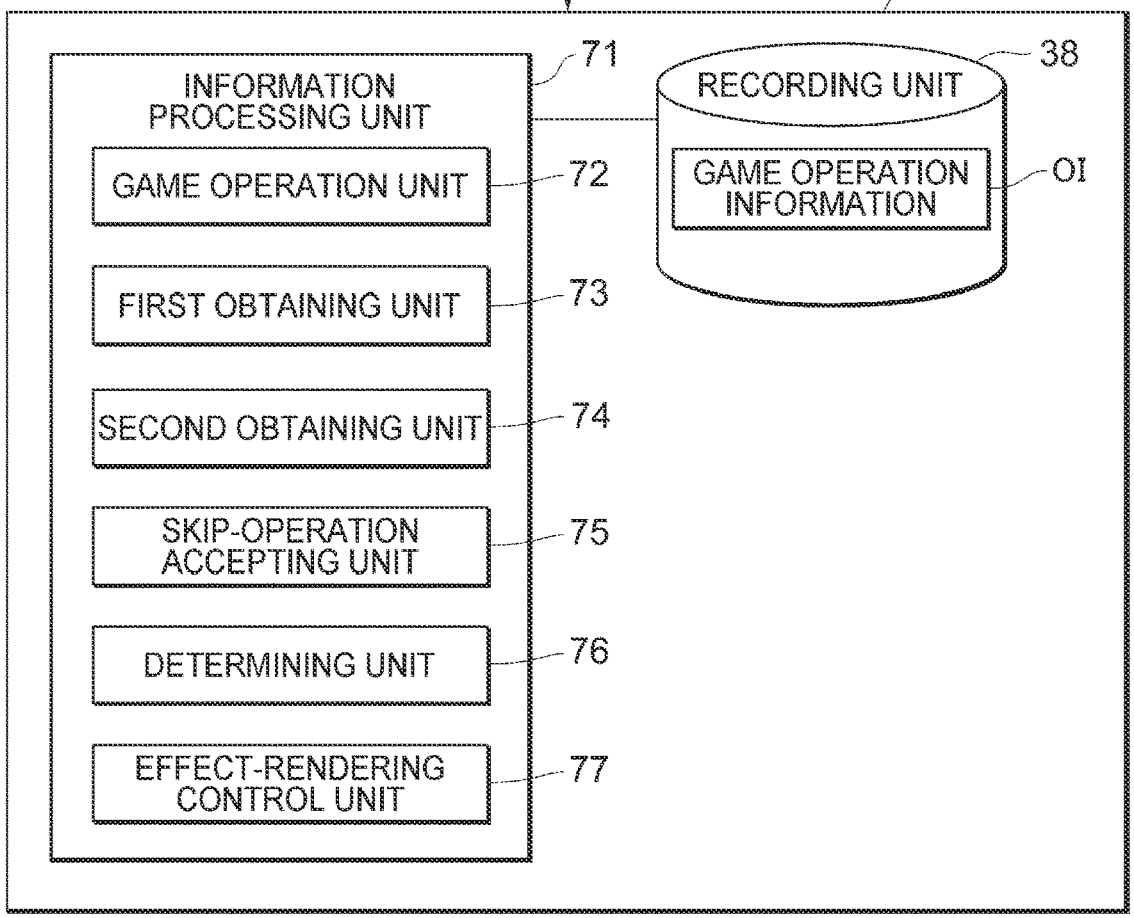

Fig. 5

| TIME POINT INFORMATION (ms) | SKIP POINTS | SKIP ARRIVAL POINT |
|---|---|---|
| 562 | ○ | – |
| 1312 | ○ | – |
| 2062 | ○ | – |
| 2814 | ○ | – |
| 3562 | ○ | – |
| 4312 | ○ | – |
| 5062 | ○ | – |
| ... | ... | ... |
| 14766 | ○ | – |
| 15516 | ○ | – |
| 16266 | ○ | – |
| 17016 | ○ | – |
| ... | ... | ... |
| 26XXX | ... | ○ |
| ... | ... | ... |

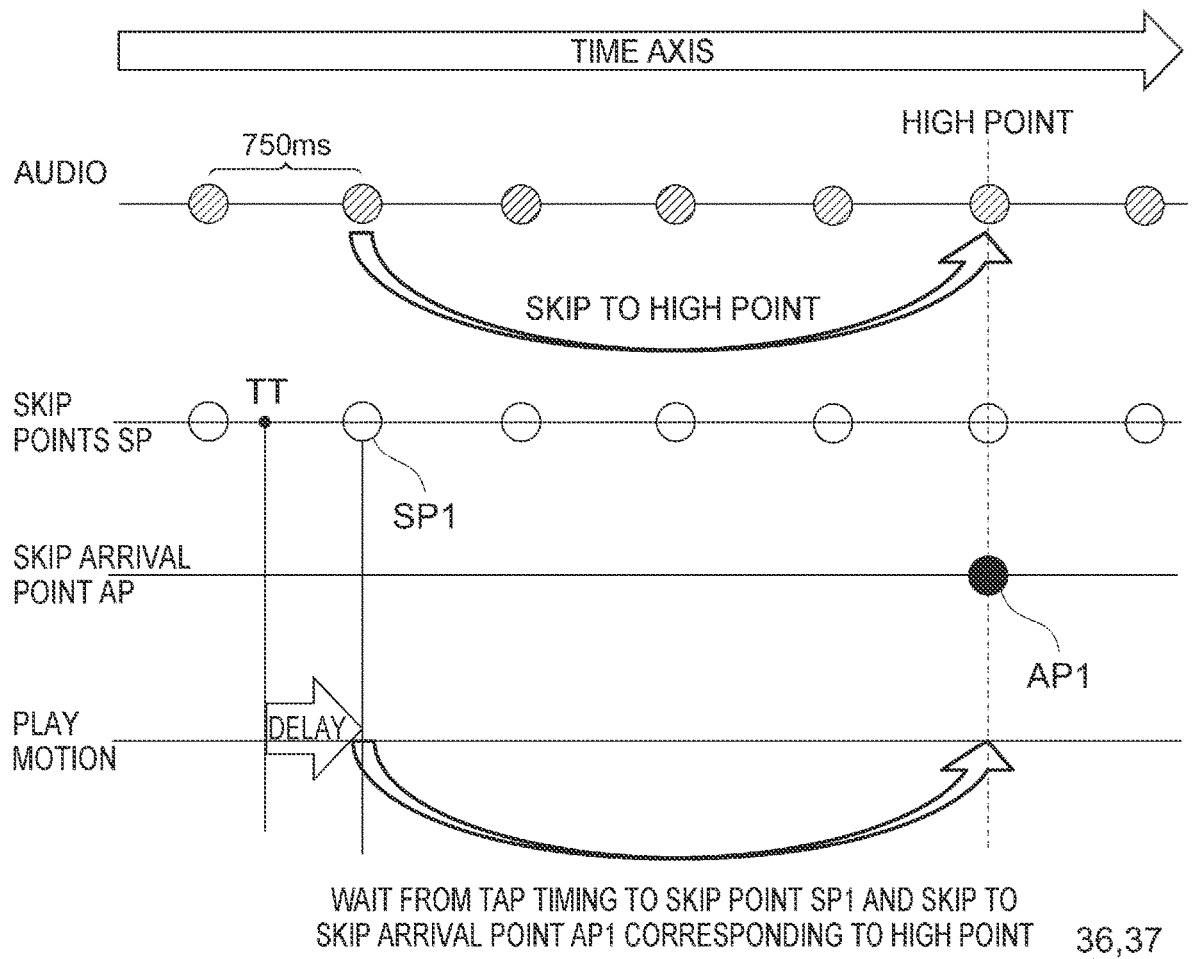
Fig. 7
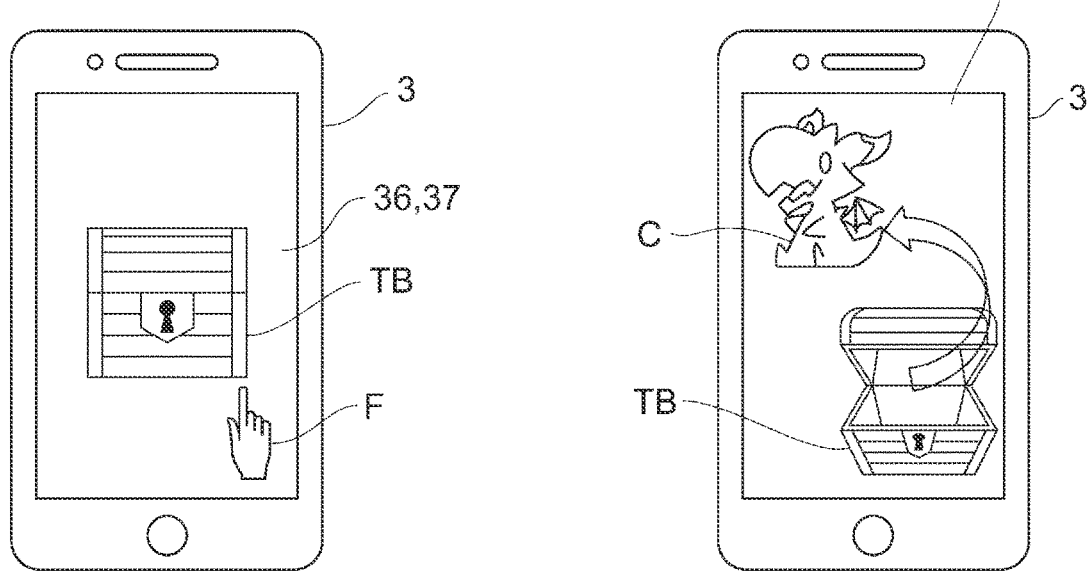

INFORMATION PROCESSING PROGRAM, TERMINAL DEVICE, AND INFORMATION PROCESSING METHOD

TECHNICAL FIELD

The present invention relates to information processing programs, terminal devices, and information processing methods.

BACKGROUND ART

Recently, game-information providing systems featuring amusement involving an element of lottery, called "gacha", in which a randomly selected item or the like in a game is provided on the basis of an acquisition request from a game user, have appeared.

Patent Literature 1 discloses a game-information providing system that displays predetermined effects on the screen of a terminal device while gacha is being executed.

CITATION LIST

Patent Literature

{PTL 1}
Japanese Unexamined Patent Application, Publication No. 2014-200264

SUMMARY OF INVENTION

Technical Problem

With a terminal device included in an existing game-information providing system such as the one disclosed in Patent Literature 1, it is generally the case that video is played while performing rendering. Thus, in the case where effects relating to gacha are skipped at an arbitrary timing due to a factor such as a video rendering delay, there is difficulty in seamlessly resuming effect rendering at a skip destination.

Accordingly, some aspects of the present invention have been made in view of the situation described above, and it is an object thereof to provide an information processing program, a terminal device, and an information processing method that make it possible to seamlessly resume effect rendering for outputting video and audio after the effect rendering is skipped at an arbitrary timing.

Solution to Problem

An information processing program according to an aspect of the present invention is an information processing program that is executed at a terminal device that executes effect rendering for outputting video and audio, the information processing program causing the execution of: a first obtaining unit that obtains video data and audio data; a second obtaining unit that obtains skip point information indicating skip points for the effect rendering and skip arrival point information indicating a skip arrival point for the effect rendering; a skip-operation accepting unit that accepts an operation for skipping the effect rendering; and an effect-rendering control unit that controls the effect rendering by skipping the video data to a predetermined point on the basis of the accepted skip operation to resume the output of the video from that point, and in the case where the timing of accepting the skip operation does not coincide with the skip point, by waiting until the skip point after that timing and then skipping to a specific skip arrival point associated with that skip point, on the basis of the skip operation, to resume the output of the audio from that specific skip arrival point.

A terminal device according to an aspect of the present invention is a terminal device that executes effect rendering for outputting video and audio, the terminal device including: a first obtaining unit that obtains video data and audio data; a second obtaining unit that obtains skip point information indicating skip points for the effect rendering and skip arrival point information indicating a skip arrival point for the effect rendering; a skip-operation accepting unit that accepts an operation for skipping the effect rendering; and an effect-rendering control unit that controls the effect rendering by skipping the video data to a predetermined point on the basis of the accepted skip operation to resume the output of the video from that point, and in the case where the timing of accepting the skip operation does not coincide with the skip point, by waiting until the skip point after that timing and then skipping to a specific skip arrival point associated with that skip point, on the basis of the skip operation, to resume the output of the audio from that specific skip arrival point.

An information processing method according to an aspect of the present invention is an information processing method that is executed at a terminal device that executes effect rendering for outputting video and audio, the information processing method including: a step of obtaining video data and audio data; a step of obtaining skip point information indicating skip points for the effect rendering and skip arrival point information indicating a skip arrival point for the effect rendering; a step of accepting an operation for skipping the effect rendering; and a step of controlling the effect rendering by skipping the video data to a predetermined point on the basis of the accepted skip operation to resume the output of the video from that point, and in the case where the timing of accepting the skip operation does not coincide with the skip point, by waiting until the skip point after that timing and then skipping to a specific skip arrival point associated with that skip point, on the basis of the skip operation, to resume the output of the audio from that specific skip arrival point.

A "player" refers to a user who operates a terminal device, and is also a concept corresponding to a client in what is called a client-server system. Furthermore, generally, a "player" may participate in a game via what is called a player character that is engaged in activities, take actions, and so forth in a virtual game space instead of the player himself or herself.

Examples of a "game" include a game in which a player character or an item is raised, a game in which a player organizes a party by using an owned character and plays battles against enemy characters, and a rhythm game in which a player organizes a party by using an owned character to play the game. Furthermore, examples of a "game" may include various kinds of games, such as action games, quiz games, pinball games, and card games.

A "game medium" refers to information that is managed in association with a player in a game, and examples thereof include information relating to a game, including a character or an item. A "game medium" in this embodiment does not include what is called a medium (a CD-ROM or the like) or a game machine (a platform).

An "item" refers to information that is different from a "parameter", which will be described later. For example, an "item" refers to something generating an effect that brings about an advantage in proceeding with a game in which a player participates, relative to other players or enemy characters in the game, or something that enhances a value or a sense of value when it is acquired or owned, and the kinds thereof are not particularly limited. Examples of an "item" include various kinds of items for increasing the offensive power, the defensive power, etc. of the player. However, without limitation to those items, examples of an "item" may include various kinds of items for increasing damage to other players or enemy characters in the game, various kinds of items for recovering the stamina of the player, etc.

"Game-medium lottery processing" refers to predetermined processing by which a game medium can be obtained. For example, "game-medium lottery processing" may include "gacha", which is a mechanism for obtaining a predetermined item by consuming an in-game currency, in-game points, or the like that can be obtained by using real money, including cash and electronic money, a credit card, a prepaid card, or the like, or by consuming a parameter, which will be described later. Although an in-game currency and in-game points can be obtained by using real money, a credit card, a prepaid card, or the like, as described above, an in-game currency and in-game points may be obtained in other ways, such as success in an event and an improvement in the level of a player.

It is to be noted that, in the present invention, a "unit" does not simply refer to a physical means but also includes the case where the functionality of the "unit" is realized by software. Furthermore, the functionality of one "unit" or device may be realized by two or more physical means or devices, and the functionality of two or more "units" or devices may be realized by a single physical means or device.

Advantageous Effects of Invention

The present invention makes it possible to seamlessly resume effect rendering for outputting video and audio after the effect rendering is skipped at an arbitrary timing.

BRIEF DESCRIPTION OF DRAWINGS

FIG. 4 is a schematic configuration diagram (block diagram) showing an example of the functional configurations of the information processing server and the player terminal according to the embodiment of the present invention.

FIG. 5 shows an example of time point information, skip point information, and skip arrival point information according to the embodiment of the present invention.

FIG. 7 shows the schematic chart shown in FIG. 2, showing an example of the effect-rendering execution processing, and an example screen of an output unit of the player terminal according to the embodiment of the present invention.

DESCRIPTION OF EMBODIMENTS

An embodiment of the present invention will be described below with reference to the accompanying drawings. The following embodiment is an example for explaining the present invention, and it is not intended to limit the present invention only to this embodiment. Furthermore, the present invention can be modified in various forms not departing from the gist thereof. Furthermore, the same reference signs are attached to the same components throughout the drawings wherever possible, and repeated descriptions will be omitted.

Figure 1:
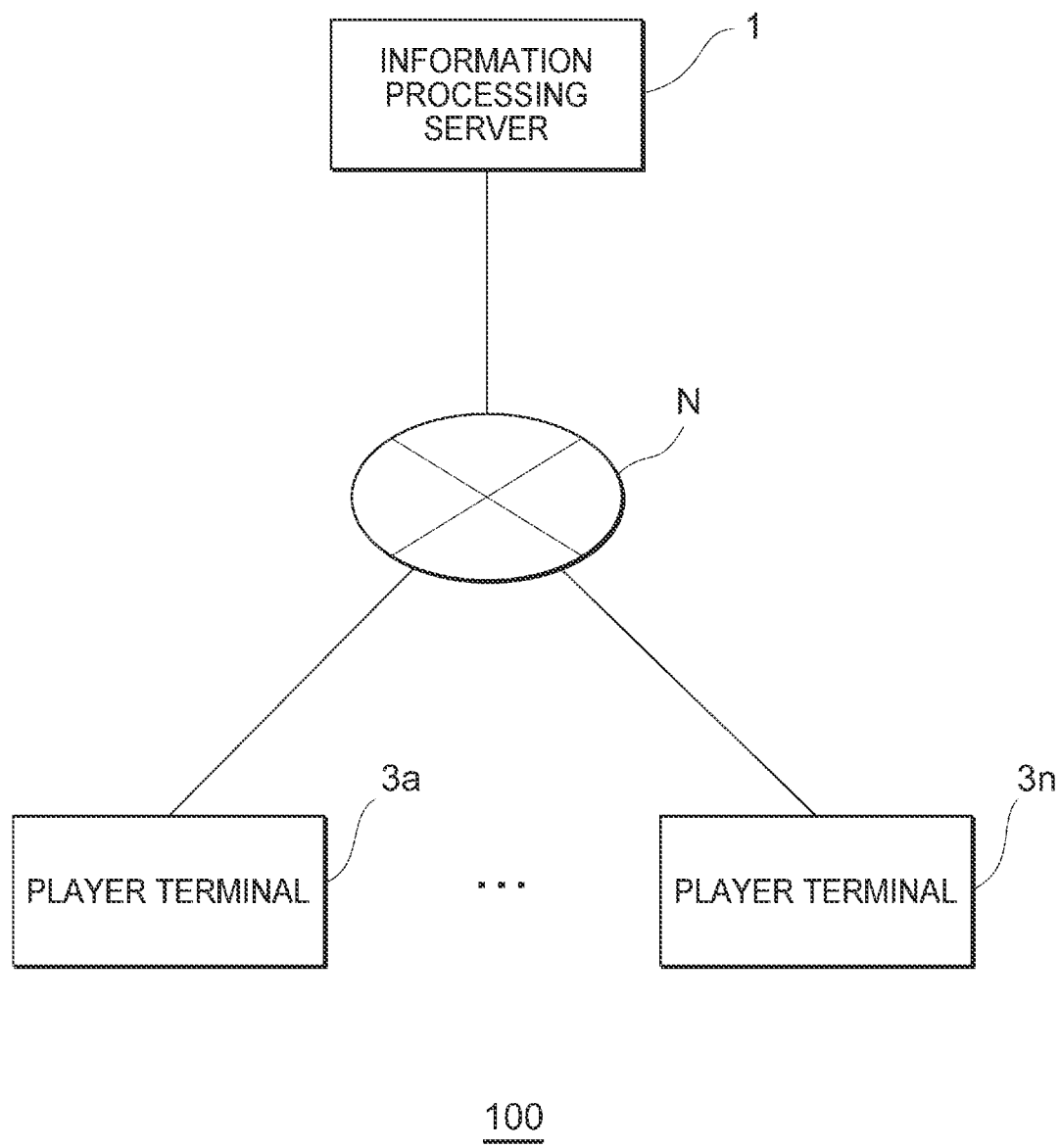
FIG. 1 is a schematic configuration diagram (system configuration diagram) of an information processing system according to an embodiment of the present invention.

FIG. 1 is a block diagram showing the overall configuration of an information processing system 100 according to this embodiment. As shown in FIG. 1, as an example, the information processing system 100 is configured to include an information processing server 1, n (n is an arbitrary integer greater than or equal to 1) player terminals 3 (terminal devices), and a network N.

The information processing system 100 is what is called a client-server system. The information processing system 100 is realized by mutually carrying out communication between the n player terminals 3 acting as clients and the information processing server 1 via the network N.

The information processing server 1 is realized, for example, by a server device. Furthermore, the player terminals 3 are realized, for example, by smartphones, game machines, or personal computers. Furthermore, the network N is realized, for example, by a network such as the Internet or a mobile phone network, a LAN (Local Area Network), or a network formed by combining these types of networks. In the drawings, a player terminal 3a and a player terminal 3n are shown as the n player terminals 3. In the following description, however, these n player terminals 3 will be simply referred to as the "player terminals 3", with the reference signs partially omitted, in the case where no distinction is made thereamong.

Figure 2:
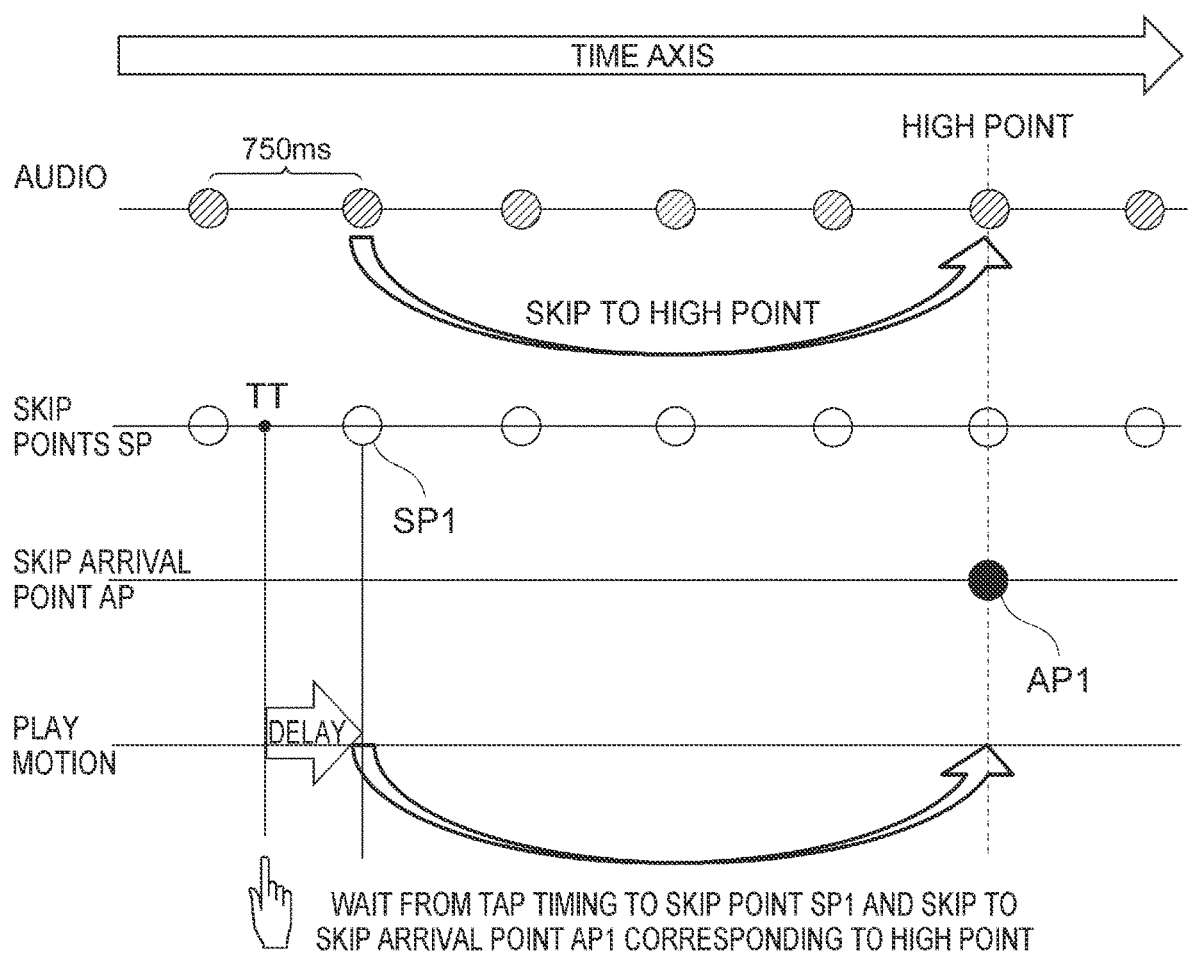
FIG. 2 is a schematic chart showing an example of effect-rendering execution processing according to the embodiment of the present invention.

Now, an overview of the information processing system 100 according to this embodiment, which manages effect rendering for outputting video and audio, will be described. FIG. 2 is a schematic chart showing an example of effect-rendering execution processing according to the embodiment of the present invention. In the information processing system 100, while game-medium lottery processing, e.g., gacha, is being executed, predetermined effects are displayed on a display screen of the player terminal 3 shown in FIG. 1. There is a demand for seamlessly resuming effect rendering for outputting video and audio after the effect rendering is skipped at an arbitrary timing in the case where an operation for skipping effect rendering (skipping operation), such as tapping the display screen of the player terminal 3, is input by a player at an arbitrary timing.

Thus, the player terminal 3 obtains video data and audio data for configuring effects, recorded in the information processing server 1. The player terminal 3 obtains skip point information indicating effect-rendering skip points SP and skip arrival point information indicating an effect-rendering skip arrival point AP, recorded in advance in the information processing server 1. Then, the player terminal 3 accepts a skip operation on the basis of a player input. The player terminal 3 controls effect rendering by skipping the video data to a predetermined point on the basis of the accepted skip operation to resume the output of the video from that point, and in the case where the timing (TT) of accepting the skip operation does not coincide with a skip point, by waiting until a skip point SP1 after that timing (TT) and then skipping to a specific skip arrival point AP1 associated with that skip point SP1, on the basis of the skip operation, to resume the output of the audio from the specific skip arrival point AP1. Note that, in this example, specific musical elements in the audio, such as beats or beat signals, and the skip points as well as the skip arrival point are not associated with each other; specific musical elements in the audio and the skip points as well as the skip arrival point are set independently of each other, and effect-rendering processing is executed.

As described above, according to this embodiment, even in the case where effect rendering relating to gacha is skipped at an arbitrary timing, it is possible to seamlessly resume the effect rendering from a predetermined skip arrival point.

That is, in this embodiment, while responding to a skip operation that is performed by the player at an arbitrary timing, the consistency of the tempo, i.e., the rate of the pulse, is maintained. Furthermore, in order to maintain the consistency of the rate of the pulse, effect-rendering skip start points and skip end points are associated with audio data as metadata, while maintaining the pulse. Although the duration of one beat is 750 ms in the example in FIG. 2, without limitation to this duration, other durations may be adopted. Furthermore, the duration of one beat need not always be constant, and it is possible to deal with effect rendering with which the pulse is changed in the middle. That is, it is possible to deal with audio data in which the pulse changes by setting skip points in accordance with the change in the pulse. Skip point data may be generated by another device, not included in the information processing system 100, may be generated automatically in the information processing system 100, or may be manually input by a game developer or the like. The following describes the specific configuration of the information processing system 100. Note that, as described above, in the example in FIG. 2, specific musical elements in the audio, such as beats or beat signals, and the skip points as well as the skip arrival point are not associated with each other; specific musical elements in the audio and the skip points as well as the skip arrival point are set independently of each other, and effect-rendering processing is executed. However, without limitation to the example, in the effect-rendering execution processing according to this embodiment, an arrangement in which specific musical elements in the audio and the skip points as well as the skip arrival point are associated with each other in advance may be adopted.

Figure 3:
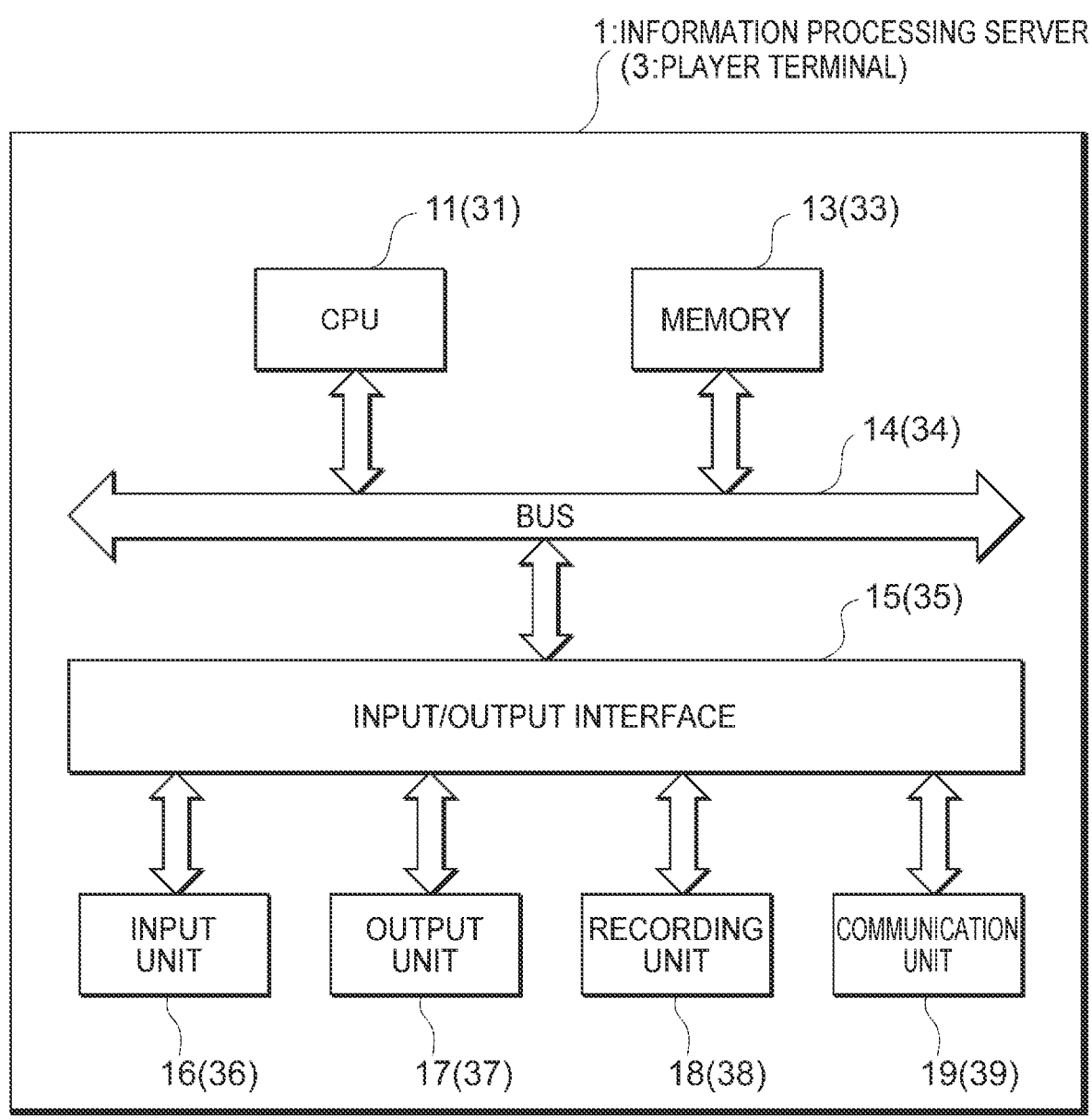
FIG. 3 is a schematic configuration diagram (block diagram) of an information processing server and a player terminal according to the embodiment of the present invention.

FIG. 3 is a block diagram showing the hardware configuration of the information processing server 1 and the hardware configuration of the player terminal 3 according to the embodiment of the present invention. In the figure, reference signs corresponding to the hardware of the information processing server 1 are shown without adding parentheses, and reference signs corresponding to the hardware of the player terminal 3 are shown with added parentheses.

As an example, the information processing server 1 includes a CPU (Central Processing Unit) 11, a memory 13 constituted of a ROM (Read Only Memory) 12, a RAM (Random Access Memory), etc., a bus 14, an input/output interface 15, an input unit 16, an output unit 17, a storage unit 18, and a communication unit 19.

The CPU 11 executes various kinds of processing according to programs recorded in the memory 13 or programs loaded from the storage unit 18 into the memory 13.

The memory 13 stores, as appropriate, data, etc. needed for the execution of various kinds of processing by the CPU 11. The CPU 11 and the memory 13 are connected to each other via the bus 14. The input/output interface 15 is also connected to the bus 14. The input unit 16, the output unit 17, the storage unit 18, and the communication unit 19 are connected to the input/output interface 15.

The input unit 16 is formed of various kinds of buttons, a touchscreen, a microphone, or the like, and accepts input of various kinds of information in accordance with instruction operations performed by the administrator of the information processing server 1 or the like. Alternatively, the input unit 16 may be realized by an input device, such as a keyboard or a mouse, that is independent of a main unit accommodating the other units of the information processing server 1.

The output unit 17 is formed of a display, a speaker, etc., and outputs image data and music data. The image data and music data output from the output unit 17 are output from the display, the speaker, etc. in forms recognizable by a player, as an image and music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 3 via the network N.

Furthermore, although not shown, a drive is provided, as needed and as appropriate, in the information processing server 1. For example, a removable medium formed of a magnetic disk, an optical disk, a magneto-optical disk, a semiconductor memory, or the like is loaded, as appropriate, in the drive. The removable medium stores a program for executing a game and various kinds of data, such as image data. The program and the various kinds of data, such as image data, read by the drive from the removable medium, are installed in the storage unit 18, as needed.

Next, the hardware configuration of the player terminal 3 will be described. As shown in FIG. 3, as an example, the player terminal 3 includes a CPU 31, a memory 33, a bus 34, an input/output interface 35, an input unit 36, an output unit 37, a storage unit 38, and a communication unit 39. These units individually have functions equivalent to those of the units having the same names and different reference signs in the information processing server 1 described above. Thus, repeated descriptions will be omitted.

FIG. 4 is a block diagram showing an example of the functional configuration of the information processing server 1 and the functional configuration of the player terminal 3 according to the embodiment of the present invention. As an example, the information processing server 1 is configured to include an information processing unit 51 that manages a game that is executed by the player terminal 3 and a recording unit 18 that has recorded therein information needed for the management of the game.

The information processing unit 51 is functionally configured to include a game management unit 53 and a lottery processing unit 55. The information processing unit 51 can be realized, for example, by the CPU 11 executing a program stored in the memory 13 or the recording unit 18 shown in FIG. 3.

The game management unit 53 is a means for managing the proceeding, etc. of a game, and manages information needed for the management of a game that is run by a game operation unit 72 of the player terminal 3, e.g., skip point information SPI and skip arrival point information API, which will be described later. When a game is played at the player terminal 3, the game management unit 53 provides the player terminal 3 with information needed for the proceeding, etc. of the game, obtains information updated on the basis of the progress of the game executed at the player terminal 3 from the player terminal 3 at an arbitrary timing, and manages the updated information.

The lottery processing unit 55 executes lottery processing, for example, for the player to acquire a game medium by consuming an in-game currency that can be obtained by using real money, including cash and electronic money, a credit card, a prepaid card, or the like. Various forms of game-medium lottery processing may be adopted.

The recording unit 18 has recorded therein skip point (skip start point) information SPI and skip arrival point (skip end point) information API. For example, an example definition of SI indicating skip points and skip arrival points will be described below. For example, in the case where it is possible to define a plurality of skip arrival points, SI is defined as in equation 1.

$$SI=\{<s1,d1>,<s2,d2>,\ldots,<sn,dn>\} \quad \text{(Eq. 1)}$$

Here, s1 signifies time point information indicating the first skip point, and d1 signifies time point information indicating a skip arrival point corresponding to the first skip point. In this example, n skip points are defined.

Alternatively, in the case where there is only one skip arrival point, SI is defined as in equation 2.

$$SI=\{s1,s2,\ldots,sn\},DEST=22345 \quad \text{(Eq. 1)}$$

Here, s1 signifies time point information indicating the first skip point, and DEST signifies time point information indicating a skip arrival point corresponding to each of all the skip points.

FIG. 5 shows an example of skip point information and skip arrival point information according to the embodiment of the present invention. FIG. 5 shows an example of the case where there is only one skip arrival point. As shown in FIG. 5, the recording unit 18 has recorded therein individual time point information (562 ms, 1312 ms, . . . ) for the skip points and the skip arrival point. Although only one skip end point is set in the example in FIG. 5, a plurality of skip end points may be set, and skip end points may be set individually for a plurality of arbitrary skip points. It suffices for a skip end point to be associated with a skip start point in advance, and, for example, a skip end point may be set in the form of a specific timing (YYY ms) or in the form of a predetermined data file name.

The time point information may be relative times corresponding to the individual skip points and the skip arrival point, or may be tags, file offsets, or the like indicating positions in the audio file. The recording unit 18 has further recorded therein video data and audio data needed for the execution of a game.

Referring back to FIG. 4, as an example, the player terminal 3 that executes a game is configured to include an information processing unit 71 that manages the operation of the game and executes effect rendering relating to gacha and a recording unit 38 that has recorded therein information needed for the operation of the game. The information processing unit 71 is configured to functionally include a game operation unit 72, a first obtaining unit 73, a second obtaining unit 74, a skip-operation accepting unit 75, a determining unit 76, and an effect-rendering control unit 77. These units of the information processing unit 71 can be realized, for example, by the CPU 31 executing a program stored in the memory 33 or the recording unit 38 shown in FIG. 3.

The game operation unit 72 executes processing for running a game. The game operation unit 72 runs the game on the basis of game software included in game operation information OI stored in the recording unit 38 and the content of a player operation input from the input unit 36 shown in FIG. 3.

As the game is run, the game operation unit 72 executes control processing for generating game images from image data included in the game operation information OI and outputting the generated images from the output unit 37. Similarly, as the game is run, the game operation unit 72 executes control processing for generating game music and audio from music data and audio data included in the game operation information OI and outputting the generated music and audio from the output unit 37.

As described above, various kinds of information in the game that is run by the game operation unit 72, e.g., skip point information and skip arrival point information, as well as various kinds of data in the video data and the audio data, are managed at the information processing server 1. Thus, in the case where processing involving a change in these various kinds of information (e.g., processing involving a change in content, such as an item, a character, a quest, or a parameter) occurs in the game, the game operation unit 72 carries out communication with the information processing server 1 to update the parameters, etc. managed by the information processing server 1. Then, the game operation unit 72 receives the updated parameters, etc. from the information processing server 1, and continues to run the game on the basis of the updated parameters, etc.

The functions of the first obtaining unit 73, the second obtaining unit 74, the skip-operation accepting unit 75, the determining unit 76, and the effect-rendering control unit 77 will be described together with a description of a flow of effect-rendering execution processing.

<Effect-Rendering Execution Processing>

Figure 6:
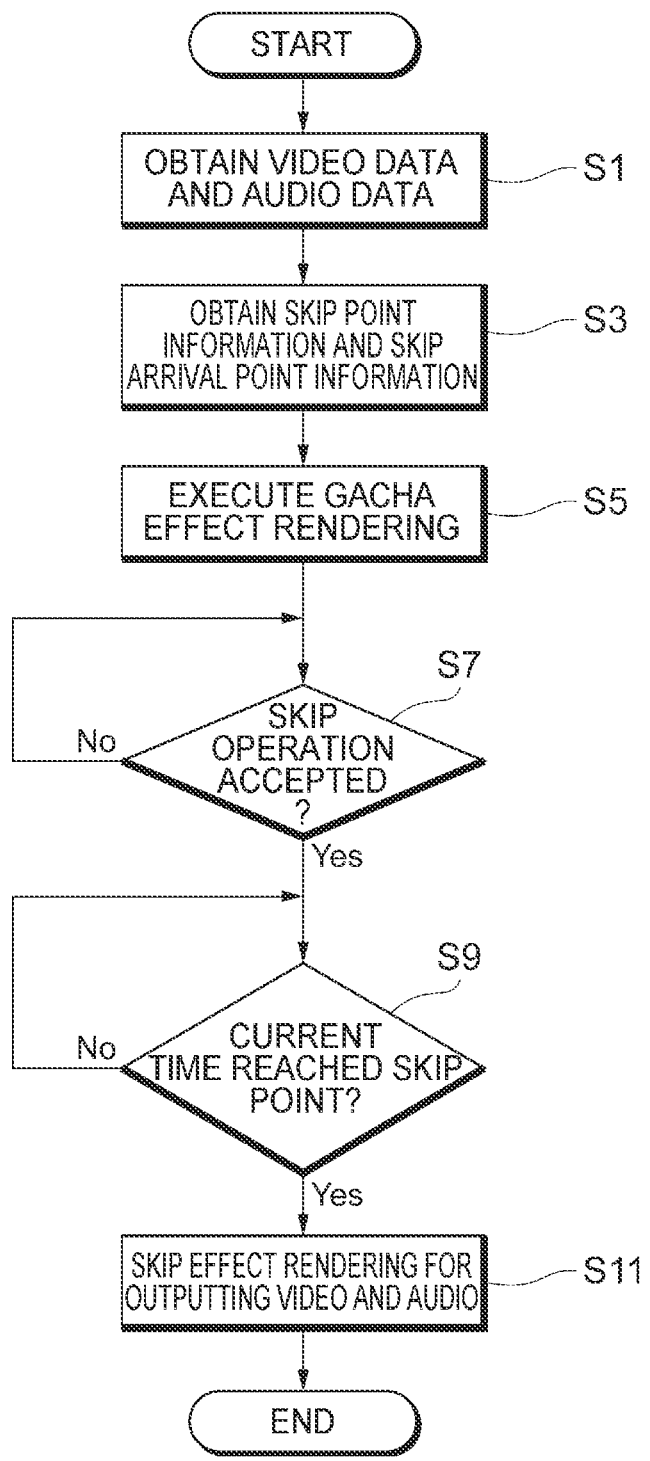
FIG. 6 is a flowchart showing an example of the effect-rendering execution processing according to the embodiment of the present invention.

An example of processing for executing effect rendering for outputting video and audio, i.e., effect rendering processing, will be described with reference to FIG. 6. FIG. 6 is a flowchart showing an example of effect-rendering execution processing according to the embodiment of the present invention.

(Step S1)

First, when a player operates his or her player terminal 3, shown in FIG. 1, to activate a game application, the first obtaining unit 73 of the player terminal 3, shown in FIG. 4, obtains the video data and the audio data for configuring effects relating to gacha, recorded at the information processing server 1, via the communication unit 19 shown in FIG. 3. The timing of obtaining the video data and the audio data by the first obtaining unit 73 is not limited to the timing of the activation of the game application, and may be the timing of executing an event relating to gacha in the game, or may be other timings. The video data and the audio data may be obtained all at once at one of the timings mentioned above, or may be obtained in a divided manner at a plurality of timings.

(Step S3)

The second obtaining unit 74 of the player terminal 3, shown in FIG. 4, obtains skip point information indicating effect-rendering skip points and skip arrival point information indicating an effect-rendering skip arrival point, recorded in advance at the information processing server 1, via the communication unit 19 shown in FIG. 3. The timing of obtaining the skip point information and the skip arrival point information by the second obtaining unit 74 is not limited to the timing of the activation of the game application, and may be the timing of executing an event relating to gacha in the game, or may be other timings. The skip point information and the skip arrival point information may be obtained all at once at one of the timings mentioned above, or may be obtained in a divided manner at a plurality of timings.

(Step S5)

When a gacha event is selected as a result of a player operation, the game operation unit 72 of the player terminal 3, shown in FIG. 4, executes gacha and executes effect rendering to indicate that gacha is being executed.

(Step S7)

The skip-operation accepting unit 75 determines whether or not an operation performed by the player to skip effect rendering relating to gacha has been accepted via the input unit 36 shown in FIG. 3. In the case where a skip operation has been accepted by the skip-operation accepting unit 75 (the case of Yes), the processing proceeds to step S9. Then, the skip-operation accepting unit 75 outputs the content of the accepted operation to the game operation unit 72 and the determining unit 76. Meanwhile, in the case where a skip operation has not been accepted by the skip-operation accepting unit 75 (the case of No), the processing waits until a skip operation is accepted.

(Step S9)

On the basis of the current time further obtained by the second obtaining unit, as well as the time information corresponding to the skip points, the determining unit 76, per unit time (e.g., one frame corresponds to about 16 ms in the case of a game at 60 FPS (frames per second)), determines whether or not the current time has reached a skip point. In the case where it is determined by the determining unit 76 that the current time has reached a skip point (the case of Yes), the processing proceeds to step S11. Meanwhile, in the case where it is determined by the determining unit 76 that the current time has not reached a skip point (the case of No), the current time is obtained periodically (e.g., every frame) and comparison processing is executed until the current time reaches a skip point.

FIG. 7 shows the schematic chart shown in FIG. 2, showing an example of the effect-rendering execution processing, and an example screen of an output unit of the player terminal according to the embodiment of the present invention. As shown in FIG. 7, effects indicating that gacha is being executed are displayed at the input unit 36 (and the output unit 37) of the player terminal 3. Here, when an operation for skipping effect rendering (skip operation), such as tapping the input unit 36 (and the output unit 37) of the player terminal 3 with a player's finger F, is input at an arbitrary timing (TT), the determining unit 76 determines whether or not the current time has reached a skip point SP1 on the basis of the current time and the time information corresponding to the skip point SP1. In the example in FIG. 7, it is indicated that the current time corresponding to the timing (TT) of accepting the skip operation has not reached the skip point SP1. Thus, at the input unit 36 (and the output unit 37), effect rendering before the result of gacha is revealed, for example, before a treasure box TB containing a character is opened, is executed.

(Step S11)

The effect-rendering control unit 77 controls effect rendering by skipping the video data to a predetermined point on the basis of the accepted skip operation to resume the output of the video from that point, and in the case where the timing of accepting the skip operation does not coincide with a skip point, by waiting until the skip point after that timing and skipping to a specific skip arrival point associated with that skip point, on the basis of the skip operation, so as to resume the output of the audio from the specific skip arrival point. In the case where the timing (TT) (e.g., 1270 ms) of accepting the skip operation does not coincide with a skip point, as shown in FIG. 5, the effect-rendering control unit 77 controls effect rendering by waiting until the skip start point (the skip point SP1) (e.g., 1312 ms) immediately after the timing (TT) of accepting the skip operation and then skipping to a skip arrival point (e.g., 26XXX ms) associated with the skip point SP1 so as to resume the output of the video from the specific skip arrival point AP1 and so as to resume the output of the audio from the specific skip arrival point AP1. For example, at the input unit 36 (and the output unit 37), effect rendering at a high point of effect rendering, e.g., the timing at which the result of gacha is revealed, more specifically, the timing at which the treasure box TB is opened and a character C is acquired, is executed.

As described above, according to the embodiment of the present invention, in the case where the timing (TT) of accepting a skip operation does not coincide with a skip point, effect rendering is controlled by waiting until the skip point SP1 immediately after that timing (TT) and then skipping to the specific skip arrival point AP1 corresponding to that skip point SP1, which corresponds to, for example, a high point, so as to resume the output of the video from the specific skip arrival point AP1 and so as to resume the output of the audio from the specific skip arrival point AP1. Thus, even in the case where effect rendering relating to gacha is skipped at an arbitrary timing, it is possible to seamlessly resume effect rendering from a predetermined skip arrival point.

Other Embodiments

The above-described embodiment is presented to facilitate the understanding of the present invention and should not be construed to limit the present invention. The present invention can be modified or improved without departing from the gist thereof, and the present invention encompasses equivalents thereof.

In the embodiment described above, effect rendering relating to gacha has been described as an example of effect rendering for outputting video and audio. However, without limitation to the example, for example, effect rendering may include a video of a scene showing a battle between player characters or a battle between a player character or an enemy character in a game. Furthermore, without limitation to effect rendering relating to a game, effect rendering may include effect rendering for outputting other kinds of video and audio.

As described earlier, as shown in FIG. 4, as an example, the player terminal 3 includes the game operation unit 72, the first obtaining unit 73, the second obtaining unit 74, the skip-operation accepting unit 75, the determining unit 76, and the effect-rendering control unit 77. This is because if these functions were provided in the information processing server 1, most information processing would be executed by the information processing server 1, which would increase the processing load on the information processing server 1. The processing is distributed between the information processing server 1 and the player terminal 3 in order to reduce the processing load. Furthermore, if the first obtaining unit 73, the second obtaining unit 74, the determining unit 76, and the effect-rendering control unit 77 were provided in the information processing server 1, it would be necessary to transmit game data to the player terminal 3 at high frequency, which would result in a huge amount of communication between the information processing server 1 and the player terminal 3. In order to reduce the amount of communication, the player terminal 3 is configured to include the game operation unit 72, the first obtaining unit 73, the second obtaining unit 74, the skip-operation accepting unit 75, the determining unit 76, and the effect-rendering control unit 77.

Here, as a result of concentrating these functions at the player terminal 3, the possibility of the player performing acts of fraud at the player terminal 3, such as tampering with various kinds of game media, various kinds of parameters, etc., increases. However, because the updated latest information is managed at the information processing server 1, it is possible to check whether or not an act of fraud has been conducted by performing comparison, as needed, with the information managed at the information processing server 1, which makes it possible to prevent acts of fraud.

REFERENCE SIGNS LIST

1 Information processing server
3 Player terminal
11 (31) CPU
13 (33) Memory
14 (34) Bus
15 (35) Input/output interface
16 (36) Input unit
17 (37) Output unit
18 (38) Recording unit
19 (39) Communication unit
51, 71 Information processing unit
53 Game management unit
55 Lottery processing unit
72 Game operation unit
73 First obtaining unit
74 Second obtaining unit
75 Skip-operation accepting unit
76 Determining unit
77 Effect-rendering control unit

The invention claimed is:

1. An information processing program that is executed at a terminal device that executes effect rendering for outputting video and audio, the information processing program causing the execution of:
   a first obtaining unit that obtains video data and audio data during an execution of a computer game, the audio data corresponding to a portion of an audio signal in the computer game;
   a second obtaining unit that obtains, during the execution of the computer game, skip point information indicating skip points for the effect rendering and skip arrival point information indicating a skip arrival point for the effect rendering;
   a skip-operation accepting unit that accepts a skip operation based on a player input within the execution of the computer game, wherein the skip operation is for skipping the effect rendering; and
   an effect-rendering control unit that:
      controls the effect rendering during the execution of the computer game by skipping the video data to a predetermined point based on the skip operation to resume the output of the video from that point, and
      in response to a timing of accepting the skip operation does not coincide with a skip point, waits until the skip point after the timing and then skipping to the skip arrival point associated with the skip point, based on the skip operation, to resume the output of the audio from the skip arrival point,
   wherein the skip point and skip arrival point are disposed in metadata within the audio data.

2. An information processing program according to claim 1,
   wherein the second obtaining unit further obtains a current time, and
   wherein the information processing program further causes the execution of a determining unit that determines, based on the current time and time information corresponding to the skip point, per unit time, whether or not the current time has reached the skip point.

3. An information processing program according to claim 1,
   wherein the player input corresponds to a touchscreen accepting a player's finger as an input to the computer game.

4. A terminal device that executes effect rendering for outputting video and audio, the terminal device comprising:
   a first obtaining unit that obtains video data and audio data during an execution of a computer game, the audio data corresponding to a portion of an audio signal in the computer game;
   a second obtaining unit that obtains, during the execution of the computer game, skip point information indicating skip points for the effect rendering and skip arrival point information indicating a skip arrival point for the effect rendering;
   a skip-operation accepting unit that accepts a skip operation based on a player input within the execution of the computer game, wherein the skip operation is for skipping the effect rendering; and
   an effect-rendering control unit that:
      controls the effect rendering during the execution of the computer game by skipping the video data to a predetermined point based on the skip operation to resume the output of the video from that point, and
      in response to a timing of accepting the skip operation does not coincide with a skip point, waits until the skip point after the timing and then skipping to the skip arrival point associated with the skip point, based on the skip operation, to resume the output of the audio from the skip arrival point,
   wherein the skip point and skip arrival point are disposed in metadata within the audio data.

5. An information processing method that is executed at a terminal device that executes effect rendering for outputting video and audio, the information processing method comprising:
   obtaining video data and audio data during an execution of a computer game, the audio data corresponding to a portion of an audio signal in the computer game;
   obtaining, during the execution of the computer game, skip point information indicating skip points for the effect rendering and skip arrival point information indicating a skip arrival point for the effect rendering;
   accepting a skip operation based on a player input within the execution of the computer game, wherein the skip operation is for skipping the effect rendering; and
   controlling the effect rendering during the execution of the computer game by skipping the video data to a predetermined point based on the skip operation to resume the output of the video from that point, and
   in response to a timing of accepting the skip operation does not coincide with a skip point, waiting until the skip point after the timing and then skipping to a skip arrival point associated with that skip point, based on the skip operation, to resume the output of the audio from the skip arrival point, wherein the skip point and skip arrival point are disposed in metadata within the audio data.

6. An information processing method according to claim 5, further comprising:

determining a video rendering delay in the computer game based on the player input, wherein the skip arrival point is located after the video rendering delay.

7. An information processing program that is executed at a terminal device that executes effect rendering for outputting video and audio, the information processing program causing the execution of:

a first obtaining unit that obtains video data and audio data during an execution of a computer game, the audio data corresponding to a portion of an audio signal in the computer game;

a second obtaining unit that obtains, during the execution of the computer game, skip point information indicating skip points for the effect rendering and skip arrival point information indicating a skip arrival point for the effect rendering;

a skip-operation accepting unit that accepts a skip operation based on a player input within the execution of the computer game, wherein the skip operation is for skipping the effect rendering; and an effect-rendering control unit that:

controls the effect rendering during the execution of the computer game by skipping the video data to a predetermined point based on the skip operation to resume the output of the video from that point, and in response to a timing of accepting the skip operation does not coincide with a skip point, waits until the skip point after the timing and then skipping to the skip arrival point associated with the skip point, based on the skip operation, to resume the output of the audio from the skip arrival point, wherein the skip point information corresponds to a predetermined rate of a pulse in game music for the computer game, and wherein the skip arrival point for the audio signal is based on a predetermined change of the pulse in the game music during the computer game.

\* \* \* \* \*